US007272392B2

(12) United States Patent
Boda (10) Patent No.: US 7,272,392 B2
(45) Date of Patent: Sep. 18, 2007

(54) CONNECTION SET-UP IN A COMMUNICATION SYSTEM

(75) Inventor: Peter Boda, Helsinki (FI)

(73) Assignee: Nokia Corporation, Espoo (FI)

( * ) Notice: Subject to any disclaimer, the term of this patent is extended or adjusted under 35 U.S.C. 154(b) by 440 days.

(21) Appl. No.: 10/701,065

(22) Filed: Nov. 5, 2003

(65) Prior Publication Data

US 2004/0142689 A1 Jul. 22, 2004

(30) Foreign Application Priority Data

Nov. 6, 2002 (GB) ................................. 0225888.7

(51) Int. Cl.
*H04Q 7/20* (2006.01)
*H04Q 7/24* (2006.01)
(52) U.S. Cl. .............................. 455/432.1; 455/435.1; 455/432.2; 370/352
(58) Field of Classification Search ............. 455/432.1, 455/433, 435.1, 435.2; 370/352
See application file for complete search history.

(56) References Cited

U.S. PATENT DOCUMENTS

| 6,414,950 | B1 * | 7/2002 | Rai et al. ..................... 370/338 |
| 6,697,354 | B1 * | 2/2004 | Borella et al. ............... 370/352 |
| 6,940,848 | B1 * | 9/2005 | Liu et al. ..................... 370/352 |
| 2003/0134650 | A1 * | 7/2003 | Sundar et al. ............... 455/465 |
| 2004/0029585 | A1 * | 2/2004 | Akgun et al. ............. 455/432.2 |

FOREIGN PATENT DOCUMENTS

| WO | WO99/60801 | 11/1999 |
| WO | WO 00/07403 | 2/2000 |
| WO | WO 00/18154 | 3/2000 |
| WO | WO 00/56085 | 9/2000 |
| WO | WO 01/52501 A2 | 7/2001 |
| WO | WO 02/25985 A1 | 3/2002 |

OTHER PUBLICATIONS

"Seamless IP-based Service Integration Across Fixed/Mobile and Corporate/Public Networks", Wietfeld et al, IEEE 49th Vehicular Technology Conference, 1999, published Jul. 1999, pp. 1930-1934, vol. 3.

(Continued)

*Primary Examiner*—Erika A. Gary
(74) *Attorney, Agent, or Firm*—Squire, Sanders & Dempsey L.L.P.

(57) ABSTRACT

The present invention relates to provision of connections in a communication system, and more particularly, to establishment of a connection involving a mobile station subscribing to a first mobile communications network and roaming in a second mobile communications network. The communication system comprises a first connection management entity provided in association with the first mobile communication network and a second connection management entity provided in association with the second mobile communication network. In the method the roaming mobile station is registered with the second mobile communications network and with the second connection management entity. In response to a request for a connection involving the roaming mobile station, signalling that associates with the request is routed to one of the connection management entities. A communications link is then set-up between the first and second mobile communications networks via a third communications network by means of the first and second connection management entities based on said signalling associated with the request. The requested connection is then established by means of the communications link and the first and second mobile communications networks.

36 Claims, 4 Drawing Sheets

OTHER PUBLICATIONS

"An Introduction to GSM Enhancement for Operator Specific Services (CAMEL)", Smith, IEE Colloquium on Mobile Communications Towards the Next Millenium and Beyond, published May 17, 1996, pp. 6/1-6/9.

"Supporting Mobility with Wireless ATM", Varshney, Computer Magazine, vol. 30, No. 1, published Jan. 1997, pp. 131-133.

* cited by examiner

CONNECTION SET-UP IN A COMMUNICATION SYSTEM

CROSS-REFERENCES TO RELATED APPLICATIONS

This application claims priority of United Kingdom Patent Application No. 0225888.7 filed on Nov. 6, 2002 in the United Kingdom. The subject matter of the above referenced application is incorporated by reference.

BACKGROUND OF THE INVENTION

1. Field of Invention:

The present invention relates to the field of mobile telecommunications, and, more specifically, to connection set-up between parties when at least one of the parties communicates by means of a roaming mobile station.

2. Description of Related Art:

Mobile telecommunications systems providing mobility for the users of mobile user equipment (UE) referenced to as mobile stations (MS) are known. A typical example of a mobile station is the mobile telephone. However, other types of mobile stations than mobile telephones are also known, these including devices such as mobile personal data assistants (PDA) or portable or otherwise mobile computers (e.g. laptop PCs) provided with means for wireless communication.

A feature of the mobile telecommunications systems is that these systems enable the users thereof to make and receive calls and otherwise use their mobile stations also in visited networks in addition to enabling mobility in the home network of the mobile subscriber.

Use of the resources of network other than the home network is referenced to as roaming. The roamed network will be referenced to in the following as a visited network. The visited network is typically a network run by another operator. The network can be operated either abroad or in the same country as where the home network operates.

A typical example of the roaming is when a subscriber to a network operated in a first country uses his/her mobile station via a network operated in another country when visiting said other country. This type of roaming is known as international roaming. However, as mentioned above, the user may also roam into a network operated in the home country of the user.

The costs of roaming, and especially international roaming to mobile users can be relatively high compared to home network mobile communications or Public Switched Telephone Network (PSTN) communications via, for example, fixed telephone lines from a foreign country. A reason for this is that the mobile subscriber may be subjected to costs such as international call charges, specific roaming charges and other costs he/she would not be liable if using his/hers mobile station in the home network. The cost factor may be especially relevant for organisations such as big corporations, international communities and similar bodies responsible for paying the phone bills of a substantial number of travellers.

Bodies such as the European Commission, the European Parliament, the International Telecommunications Users Group (INTUG) and the British regulator OFTEL have expressed concern about, or launched inquiries into the high costs associated with roaming. For example, a recent INTUG study has shown that the difference in price between roaming and non-roaming international mobile calls within the European Union (EU) can be as high as 500 percent. At a time when fixed telecommunications costs and prices are falling, the prices for international mobile roaming are considered by many to be spiralling out of control. These high calling charges are of particular concern to organisations where a constant need to work and otherwise communicate in different countries exists.

Furthermore, users may be unaware how extra fees in their telephone bills are formulated, and on what basis an operator or operators actually do charge them. Customer complaints are often related to roaming costs which have taken the subscribers by surprise.

Roaming costs are present in the current billing mechanism for mobile users. Although it could be possible to rely more on fixed line connections when roaming this would mean that the advantage of mobility is lost.

A number of mobile telecommunications operators offer special International Direct Dial (IDD) services for pre-paid users. Whilst an IDD service may be used for reducing the costs of outgoing calls abroad such solutions are not particularly user-friendly. The user-unfriendliness may be increased by the fact that they typically operate on an Interactive Voice Response (IVR) platform. The users may find it frustrating to dial in to an IVR platform, authenticate themselves with a Personal Identification Number (PIN) code or similar means and then eventually key in the number they want to reach. Moreover, this approach does not provide a solution for receiving calls whilst abroad without becoming liable for the roaming costs. In this latter case, the international roaming costs are payable, since the home number of the roaming user is seen as a foreign number from the actual country the roaming user is in.

SUMMARY OF INVENTION

Embodiments of the present invention aim to address one or several of the above problems. An aim of the embodiments is to enable roaming by mobile users at a lower cost than in the prior art.

According to one embodiment, there is provided a method of establishing a connection in a communication system. The connection involves a mobile station subscribing to a first mobile communications network and roaming in a second mobile communications network. The communication system comprises a first connection management entity provided in association with the first mobile communication network and a second connection management entity provided in association with the second mobile communication network. In the method the roaming mobile station is registered with the second mobile communications network and the second connection management entity. If a connection involving the roaming mobile station is requested, signalling that associates with the request is then routed to one of the connection management entities. A communications link between the first and second mobile communications networks is set up via a third communications network by means of the first and second connection management entities based on said signalling associated with the request, the requested connection being then provided by means of the communications link, the first mobile communications network and the second mobile communications network.

According to another embodiment of the present invention there is provided a communication system comprising a first mobile communications network, a second mobile communications network, and a third communications network. The communications system further comprises a register for registering a roaming mobile station with the second mobile communications network. The registration enabled the roaming mobile station to communicate via the second mobile communications network. A first connection management entity is also provided in association with the first mobile communication network and a second connection management entity is provided in association with the second mobile communication network. The management entities interface the third communication network. The first and second connection management entities are arranged to provide a connection for a mobile station subscribing to the first mobile communications network and roaming in the second mobile communications network and registered with said register and also with said second connection management entity by setting up a communications link between the first and second mobile communications networks via the third communications network.

According to yet another embodiment of the present invention there is provided a mobile station subscribing to a first mobile communication network and enabled to roam in a second mobile communication network. The mobile station comprises means for converting a destination party number into a number of a connection management entity provided in association with the second mobile communication network, said connection management entity interfacing a third communications network and being configured to provide a communications link between the first and second mobile communications networks via the third communications network such that normal call routing between the first and second mobile communication networks is bypassed.

According to yet another embodiment of the present invention there is provided a connection management entity for a mobile communications network. The connection management entity is configured to register a mobile station roaming with the mobile communications network and to communicate with another connection management entity provided in association with a second mobile communication network via a third communications network. The connection management entity is also configured to provide a connection for the roaming mobile station by means of a communications link set-up between the first and second mobile communications networks via the third communications network.

The third communications network is preferably a packet switched data network. The packet switched data network preferably operates based on the Internet Protocol (IP), a frame relay, or asynchronous transfer mode (ATM).

The request for connection may originate from the roaming mobile station or the request may be for a connection to the roaming mobile station. The connection may be requested by the user of the roaming mobile station by calling to the second connection management entity. The request for the connection from the roaming mobile station may be received at the switching center of the second mobile communications network and then be automatically signaled from the switching center of the second mobile communications network to the second connection management entity.

Information regarding at least one connection management entity other than said first connection management entity may be stored in the memory means of the mobile station.

The first connection management entity may store information regarding one or more terminals to which the user of the mobile station might wish to establish a connection. The stored information may be send to the second connection management entity. A connection may be established based on said information. The connection establishment may be initiated by sending a voice command from the roaming mobile station to the second connection management entity.

The request for a connection may be generated by the roaming mobile station such that the request includes information about the second connection management entity and the second party. The second mobile communications network may then route signalling associated with the request to the second connection management entity based on said information about the second connection management entity and the second connection management entity may signal to the first connection management entity based on said information about the second party.

The embodiments of the invention may provide cost-effective roaming for mobile users. The operation may be made transparent for the user. An automatic call routing via the entities provided in accordance with an embodiment may be used to ensure that the users will use the system, thus ensuring that benefits offered by the system are obtained. The automatic routing preferably occurs without any explicit effort from the user. The system may also be used for optimization of call routing by being adapted to select a cost efficient solution for the provision of call connection between a roaming user and another party of the call. The optimization may be dynamic, and may be based on real-time information about parameters such as costs, available capacity, quality of service and so on. The further embodiment may provide the roaming user with telephone diaries and dialing options he/she is familiar with in his/hers home network, and thus may find easy to use.

DETAILED DESCRIPTION OF THE PREFERRED EMBODIMENTS

Figure 1:
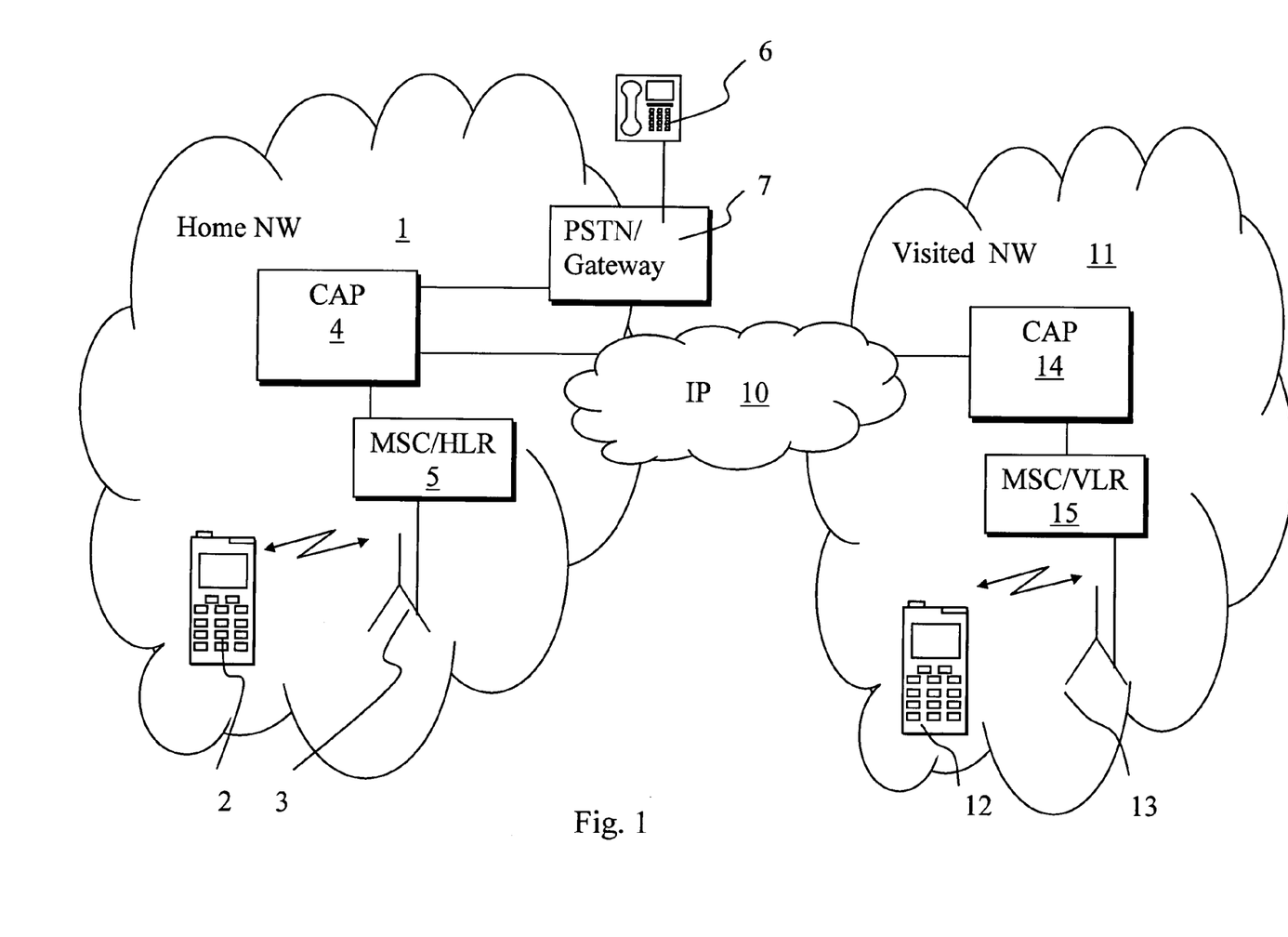
FIG. 1 is a schematic view of system for routing a connection between a mobile station roaming in a network away from its home network and a terminal in a different network, in accordance with the invention.

An embodiment in accordance with the present invention is explained with reference to FIG. 1 showing a communications system comprising three separate communication networks 1, 10, and 11. FIG. 1 also shows user equipment that may be used for communication between the users thereof. More particularly, mobile stations 2, 12 and a fixed line terminal 6 are shown. The arrangement is such that mobile stations 2 and 12 both subscribe to the first mobile communication network 1. Thus the first mobile communications network 1 is referenced to in the following as the home network or the home communications system for mobile stations 2 and 12.

The fixed line terminal 6 is shown to be connected to the mobile communications network 1 via a gateway apparatus 7 and/or PSTN network. The fixed line terminal 6 may be located in the country of the first mobile communication network 1, and thus any calls between the terminal 6 and any terminals connected to the network 1 would be considered as domestic calls. Even if not so, fixed line international calls tend to be cheaper than international calls from roaming mobile stations.

The mobile station 12 is shown to be roaming the second mobile communication network 11. The second mobile communication network 11 will thus be referenced to in the following as the visited network or the visited mobile communications network.

Each of the mobile communications networks 1, 11 may comprise various network elements such as base stations 3, 13, mobile switching centres (MSC) 5, 15 and associated registers such as home location registers (HLR) and visited location registers (VLR). It shall be appreciated that although not shown in FIG. 1, a mobile telecommunications network typically comprises further network entities such as base station controllers and/or radio network controllers, support nodes, gateways and so on. The skilled person is familiar with the required elements of a mobile telecommunications network, and therefore these elements are not discussed in more detail herein. As these elements do not form an essential part of the invention they are omitted from FIG. 1 for clarity.

The FIG. 1 arrangement is such that a connection can be established i.e. set-up via a third communication system 10 between the mobile station 12 and another party connected to the first mobile communication network 1. The other party may be another mobile station, e.g. the mobile station 2 subscribing to the home network 1 of the roaming mobile station 12. The other party may also be any other type of terminal, such as the public switched telephone network (PSTN) terminal 6. The PSTN terminal 6 may be connected to network 1 by means of the PSTN and/or suitable gateway apparatus 7 or the like.

The parties shown in FIG. 1 are associated with (e.g. work for) an organization having need to use mobile stations in at least two countries. In the following example the organization will be referenced to by the term 'company'. However, the term company shall be understood broadly as referring to any organization or similar providing a number of users with mobile and other subscriptions. Such organisations include, without any intention to be limited to these, government bodies, international and national associations, the United Nations or various sub-organisations thereof, trade organisations and so on.

The third communication network system 10 is operated independently from networks 1 and 2 such that charges for connections over the third communications network 10 (if any) are not charged in accordance with the normal charging schemes of the operators of networks 1 and 11. This is contrary to the prior art wherein the call charging function for the entire call connection path between e.g. the mobile stations 2 and 12 would have been handled by the networks 1 and 11 i.e. the networks the mobile stations subscribe to and whose resources are used for the connection. That is, even if further communication networks were used for the transportation of the communication, the parties of the call would have been charged by the operators of network 1 and/or 11.

The third communications system preferably employs packet switching for data communication. In FIG. 1 the third communication network 10 is provided by an IP (Internet Protocol) based packet data communication network. The packet data communication network is preferably an internal system of the company (e.g. an intranet of the company).

The shown IP system 10 may be adapted to provide the so called Voice over IP (VoIP) backbone for the company. The skilled person is familiar with the concepts of IP (Internet Protocol) based communication networks and VoIP backbones, and therefore these are not explained in any greater detail. It is sufficient to note that the IP is a packet switching protocol that is widely used for the inter-organizational data communication networks. The VoIP backbone can be used for establishing voice calls between terminals connected to the IP system 10.

The company has set up in association with the home network 1 and in at least one foreign country (in FIG. 1 in association with the visited network 11) a network-based connection management entity 4, 14, respectively. The connection management entities provide the terminals 2, 12, and 6 connected to the respective networks with access points so that the terminals may have connections over the third communication system 10. In the context of this particular embodiment the connection management entities will be referred to as Corporate Access Points (CAPs). The CAPs 4, 14 are able to communicate via the IP system 10 of the company employing the users of mobile stations 2 and 12.

A CAP may be provided by means of a server or similar data processing entity. The CAP server may be located at any location wherein it has access to the network 10. Thus it may be located at the premises of the company itself, at the premises of the operator of the respective communication network or even at the premises of a $3^{rd}$ party service provider. In FIG. 1 embodiment the CAP servers 4, 14 are provided with communication means enabling VoIP communication with each other over the IP network 10. The CAP servers 4, 14 are also connected to the respective mobile networks 1, 11. CAP server 4 is also shown to be connected to the fixed PSTN network. It shall be appreciated that the CAP servers 4, 14 may be connected, depending on the application, to any entity of the networks involved in provision of connections to the subscribers, such as to local MSC 5, PSTN 7, intelligent network (IN) entities (not shown) and so on.

The following discusses in more detail a distributed calling mechanism that may reduce roaming costs in case of mobile users belonging to a certain group, such as employees of a company. A network-based intelligence is made capable of routing calls originated from a mobile station roaming in a visited network. The arrangement is such that the roaming mobile station may initiate the call or receive a call from other party by means of the connection management entities.

Figure 2:
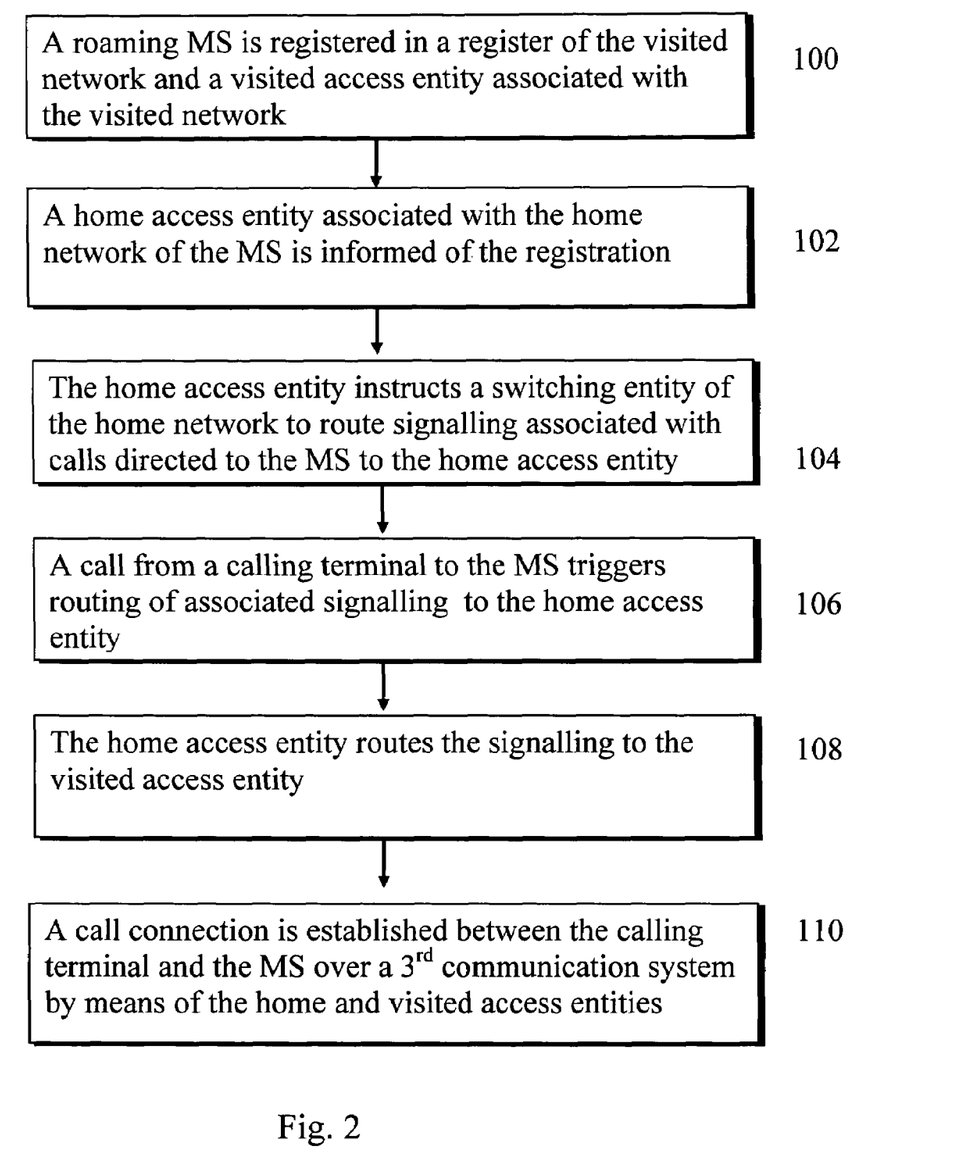
FIG. 2 is a flowchart showing steps for a call to a roaming mobile station.
Figure 3:
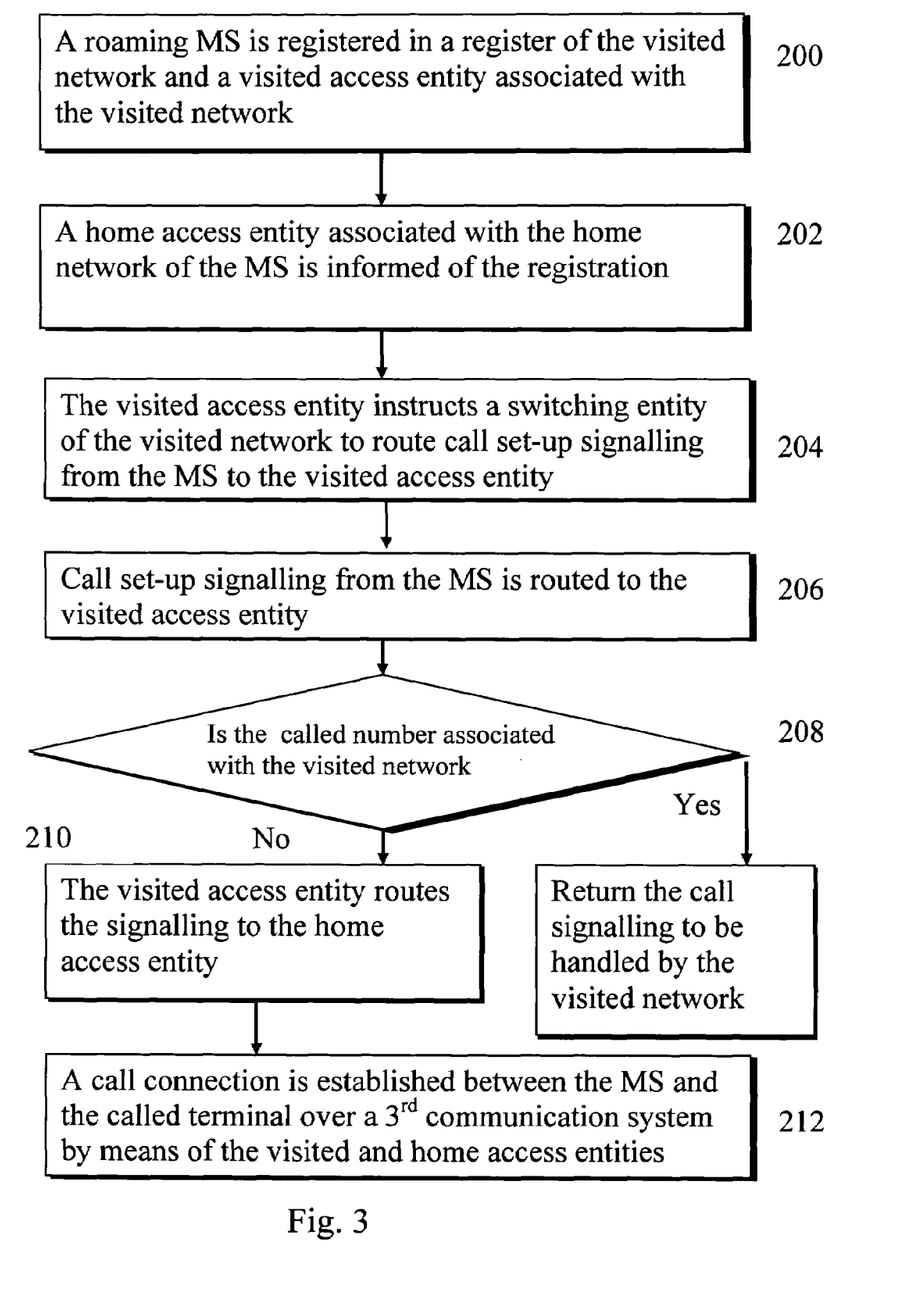
FIG. 3 is a flowchart showing steps for a call from a roaming mobile station.

A reference will now also be made to the flowcharts of FIGS. 2 and 3. FIG. 2 shows the scenario wherein a call is received while the mobile station 12 is roaming in the visited network 11. In this scenario the incoming calls that originate from the home network 1 (e.g. from the mobile station 2) are initially handled by the home CAP 4. FIG. 3, in turn, shows possible steps for situation wherein the roaming mobile station 12 makes a call. Processing of the outgoing call to route to the call via the IP system 10 is initially handled by the foreign CAP 14.

In both cases the respective CAP assists the call connections through the VoIP backbone of the company provided by means of the IP system 10. Both CAPs may verify if a call connection is to be handled by it, and if not, return the connection handling process to the network. This may be implemented e.g. by returning a message to the telecommunications network, e.g. to the MSC 5 of the mobile network 1, instructing the call connection to be handled by the element of the mobile network.

When the user of the mobile station 12 arrives to a foreign country, the mobile station 12 may register into the local operator's network 11 in a normal manner at step 100. The registration process may be handled by the mobile switching centre and visitor location register (MSC/VLR) 15. As the registration process as such is well defined by appropriate mobile telecommunication standards, it will not be discussed in here in more detail. It is sufficient to note that the registration is typically required e.g. for the purposes of providing required call routing and charging information.

In addition, the mobile station 12 is also adapted to register at step 100 into the local CAP 14 of the company. The local CAP is associated with the visited network 11, and may thus also be referenced to as visited CAP.

In order to improve user friendliness of the system and well as to ensure that all roaming users indeed register into the local CAP, it is advantageous if the registration process is automatic so that it occurs seamlessly and transparently from the user.

The registration process may be triggered automatically by the mobile station 12, e.g. in response to detection that the operator of the network is different from the network the mobile station subscribes to. The mobile station can be made aware of the network into which it has roamed in various manners. The mobile stations may detect the change in the operator e.g. based on the operator indicator received from the base station during the network registration process.

Another possibility is that the mobile station is provided with information regarding the location thereof. The location may then act as the triggering condition for the registration to the local CAP. For example, when the mobile station detects that it has entered a new country this may trigger an add-on application on the mobile station to register to the local CAP. Such a location information may be provided e.g. by the so called location information services (LCS) associated with the mobile network, or by a satellite based positioning system, such as the GPS (Global Positioning System).

The location information message itself may include an indication that the mobile station has entered an area where it needs to register into the local CAP.

Instead of automatic registration, the user of the mobile station 11 may simply request for registration in the CAP 14 e.g. by selecting an appropriate option from the menu of the mobile station, by pressing a specific button or sending a request message (e.g. a short message service message) to the CAP 14. However, the automatic registration is preferred since the cost cutting may prove difficult to realize if the registration depends solely on the users. This might be especially the case if the users feel that they are forced to use clumsy approaches. The same may apply to automatic call routing, as will be described later.

The mobile station 12 may be provided with a capability of selecting the number or other address information of the visited CAP from a list of CAPs or other information related to the CAP. The CAP list or other information is stored in memory means of the mobile station. The CAP information may consist of a list of available countries and corresponding access numbers.

It may also be advantageous if the list of CAPs or similar connection management entities can be regularly updated. The update may be based on information received from the network. A possibility is a manual update or an update by the IT personnel of the company. An incremental update may only be done, i.e. only modified country specific CAP numbers are transmitted to the mobile station.

The CAP information may be transmitted to the mobile station 12 whenever it logs in the home operator's network 1. The transmission of information may also be initiated by the home CAP. The information may be transmitted to the mobile station through the CAP in the visited country. The mobile station 12 may also fetch the list of local CAPs list from the home CAP 4 e.g. periodically (e.g. daily, weekly, monthly and so on). The fetching may occur fairly frequently in order to ensure that the mobile station 12 always has the most recent list of the local CAPs.

The address information for the local CAP may also be provided in a message from the network, such as from a LCS server (not shown) sending the location information discussed above.

The contacted visited CAP may authenticate the mobile station e.g. based on the phone number of the mobile station (e.g. the Mobile Subscriber International Integrated Services Digital Network number; MSISDN) or other unique identifier depending on the application. Depending e.g. on the required security level and the used applications the identification may be based e.g. on the International mobile subscriber identifier (IMSI), subscriber identity module (SIM) number, a unique identifier of the mobile device itself (e.g. IMEI; International Mobile Equipment Identity), and so on.

The implementation of the registration function may require modifications to the software part of the mobile station. It shall be appreciated that the next generation mobile stations, such as the Symbian™ based mobile devices are coming to the market, and that these devices are adapted to enable easy implementation of simple device-based applications. Thus the required functionalities of the mobile station may also be implemented as a non-proprietary solution (e.g. as an add-on software).

After a successful authentication, i.e. the mobile station 12 is satisfactory being identified as being a corporate user e.g. based on the Mobile Subscriber International Integrated Services Digital Network (MSISDN), IMSI, SIM, or IMEI codes thereof, the foreign CAP 14 informs at step 102 the home CAP 4 of the registration of the roaming mobile station 12. After the home CAP 4 has received notification from the visited CAP 14 that the mobile station 12 is roaming within the network, the home CAP 4 may update its records in this regards so that it can route any calls to the mobile station 12 via the IP system 10.

The home CAP 4 may also request from the home network 1 for a general divert in the network 1 of all incoming calls to the mobile station 12 at step 104. The divert may be arranged so that all incoming calls to the user are redirected to the home CAP 4.

Routing of calls to the home CAP 4 instead of normal routing mechanism of the home network 1, a so called $3^{rd}$ party divert mechanism may be set-up. A divert set-up can be initiated for a given subscriber by the home CAP. This functionality may be implemented e.g. such that when the home CAP 4 receives a message from the visited CAP 14 that a particular corporate user is abroad the home CAP sends a divert request to the local mobile operator. The divert request message is preferably generated as if it would come from the mobile station 12. For example, a message originating from the roaming mobile station 12 may be communicated via an http request from the visited CAP 14 to the home CAP 4, and further to the home MSC 5.

Use of a http-originated divert may require agreements with the operator of the MSC. Nevertheless, this is a functionality of the present mobile networks and at least the operator of the network is authorized to setup a divert for any subscriber.

In addition to informing the MSC/HLR of the divert request, it is possible to send other messages such as various notifications or acknowledgements to the user(s), other CAPs and so on.

As mentioned, FIG. 2 illustrates a situation wherein a call is made to the roaming mobile station 12, e.g. by the mobile station 2. The routing of signalling associated with the establishment of a call connection may be routed automatically to the home CAP 4 at step 106. This may be accomplished e.g. such that during the call set-up, the home MSC 5 checks for the routing information from appropriate records. Upon detection that the call is to be diverted to the home CAP 4, required signalling information is passed to the CAP 4. The home CAP receives the call set-up signalling and initiates a call to the user over the VoIP network 10 between the two mobile networks 1 and 11 and via the visited CAP 14, step 108.

When signalling associated with the call is received in the visited CAP 14 it issues a call to the local MSC 15. The visited CAP 14 may trigger the MSC 15 to provide the call connection establishment such that the MSC 15 does not do any further checks. Instead, the local MSC 15 just places the call to the user in the coverage area thereof. In other words, the visited CAP 14 preferably establishes a call set-up through the visited MSC 15 without executing any VLR-HLR communication by the visited MSC. E.g. in the GSM (Global System for Mobile) the visited MSC would only perform the latter part of the two-stage call setup mechanism.

It shall be appreciated that the availability of this functionality of the MSC may be vendor and/or operator dependent. In certain applications it may be necessary to have an agreement between the operator of the MSC and the operator of the CAP that a "forced" call setup is applicable.

If the call is answered by the roaming user, the redirected incoming call to the CAP 14 and the VoIP channel is connected at step 110. After the call connection between the terminals 2 and 12 is set-up, the CAPs 4, 14 are preferably dropped from the line. Thus the called roaming subscriber and the calling party may become directly connected through the VoIP.

FIG. 3 shows a flowchart for a call from the roaming mobile station 12 to another party connected to the home network 1 of the roaming mobile station 12. Steps 200 to 204 may corresponds steps 100 to 104 of FIG. 2, and are therefore not explained again. It shall be appreciated that the call could be made to any terminal in any network.

In a simple form of step 206 the roaming subscriber may dial the number of the local CAP 14. According to a possibility, when the roaming user initiates a call abroad the active local CAP 14 is accessed and the MSC 15 and possible other network elements of the visited network are bypassed manually by selecting the number of the CAP 14 from the menu of the mobile station 12. The local CAP number may also be stored as a speed dial number, e.g. below one of more of the keys 1 to 9. Another possibility is to use dedicated keys for this purpose.

After the local CAP 14 responds, the subscriber may then proceeds the call e.g. by dialing in the number he/she actually wanted to call. Voice prompted dialing or any other appropriate dialing method may also be used by the subscriber of the roaming mobile station 12 for instructing the local CAP 14 the set-up a call. The advantage of this approach is that It is possible to avoid introduction of any modifications to the operation of the network elements of the visited network 11.

A possibility for accessing the visited CAP is that the corporate traveller just calls the number of the other party as selected from his/her phonebook. The call is then automatically routed to the local CAP 14 and the normal call routing mechanisms of the visited network 11 is bypassed.

To implement this, the switching centre 15 of the visited network 11 may be instructed (see below for an example of instruction coming from the roaming mobile station) to automatically route any call set-up signalling in response to a call attempt by the mobile station 12 to the visited CAP 14. Thus, when the user of the mobile station 12 makes a call, the signalling is routed to the visited CAP 14 instead of the signalling being handled in the normal manner (e.g. via a gateway between the networks 1 and 2).

As an example of the automatic routing, lets assume that the number to be called party is +358-50-48 34567. The roaming user keys in the number or selects a corresponding name from the phonebook and dials the number. Now, in order to utilize the re-routing functionality of the visited CAP, the call can be set up as follows. Firstly, the local CAP number is dialed by the mobile station and immediately after that the above number is passed over e.g. as a DTMF sequence. This can be done automatically by means of the software of the mobile station 12. Lets assume further that the local CAP number is 444. In this case the following would occur (p being a short pause, a functionality already available in current mobile stations):

The user selects +358504834567, after which the mobile station converts the selected number into 444p358504834567, and this sequence is then transmitted from the mobile station to the network.

This mechanism is known e.g. from the '+' character conversion wherein the '+' character is replaced dynamically by the mobile station with the international call routing prefix for a given operator. A similar mechanism may be used in here with the difference that now an operator-independent network entity (i.e. the visited CAP) is called up which then re-routes the call according to the dialed number.

After the local CAP 14 has been accessed, it may take care of the most optimal routing of the call and e.g. decide whether the call is to be realized over the VoIP network or locally, step 208. The visited CAP 14 may verify if the call should be routed via the third communication system. If so, the CAP 14 will then set up a VoIP connection between it and the home CAP 4 of the mobile station 12 at step 210.

The verification criteria may be determined by the owner of the CAP or any other instance authorize to do so. The possibility of controlling the number space wherefrom calls can be received can provide advantages in view of saving costs and/or saving capacity of the system. It is up to the company to decide for whom it allows a reduced cost call. For example, the visited CAP may accept all calls from anyone to the roaming user, only calls from other employees of the company or from callers in a predefined list and so on. The set-up may be such that the company employees cannot call to private (i.e. not work related) numbers through the proposed method. Also, the company may wish to control whether calls from e.g. customers, subcontractors or other partner in business of the company are routed through the system or not. Since the called party pays in normal cases the cost of the international transfer when abroad, the company may decide that every call to its employee is routed through the system and thus reducing costs both for incoming and employee originated calls.

If the visited CAP 14 determines that the connection to the called terminal shall not be handled via the third communication system 10, the MSC 15 is informed accordingly and responsibility for handling of the call is transferred back to the visited network 11. The call set-up processing will then be handled by the MSC 15 and other networks elements of the network 11 in the conventional manner.

If the call is to be routed over the VoIP system 10, the required set-up signalling information is transported to the home CAP 4. The home CAP 4 then sets up at step 212 a connection between it and the called party.

After the call connection between the terminals 12 and e.g. terminal 2 or 6 is set up at step 212, the CAPs may drop from the line. Thus the called and calling party may become directly connected through the VoIP on the IP system 10.

It shall be appreciated that the connections between the CAP 4 and the mobile station 2 and the CAP 14 and the mobile station 12 can be seen as local calls or inter network calls. These connections will thus be charged at a lower rate than what e.g. an international call or a long distance call charges would be. The international or other long distance connection between the two networks is handled by the IP system 10 instead of e.g. a PSTN connection between the two networks. The IP system 10 may be an intranet system of the company. The international data transportation costs are typically much lower in the IP based systems than what they would be if handled in the conventional way for a roaming mobile subscriber.

Some applications may require communication of other information between the connection management entities and/or network entities. For example, information such as roaming mobile subscriber numbers or other temporary numbers may need to be signaled between the respective connection management entities and appropriate network entities of the home and/or visited networks (for example, the HLR of the subscriber and/or the visited location register of the roamed network).

The invention also enables use of Virtual Private Network (VPN) numbers also when the mobile station is abroad in a similar manner as the VPN numbers are used in the home country. That is, there is no need to append country codes and additional prefix prior to these extension numbers (for example, 34567 vs. +358-7788-34567). This can be used to avoid the sometimes frustrating task to store two numbers for the same colleague, one extension number for VPN calls in the home country and another one when called from abroad. Even if a user does not use the VPN numbers, the system may be provided with the required intelligence to identify whether a corporate user was dialed and in such case it applies the VPN number. Thus 34567 would be converted to 444p34567 which will then apply. This may be done, for example, by means of a number mapping scheme at the home access point (i.e. home CAP in the above examples).

A user may want to by-pass the herein described functionality of passing of calls via the third communication system. It can be agreed, for instance, that whenever a '−' sign is used instead of a '+' sign in front of a number, that number will be called without intervention by the local connection management entity. For all the other numbers stored in the usual international format, using the '+' sign, the connection management entity will assist in routing the call over the third communication system and the connection management entity associated with the home network of the subscriber.

A further embodiment provides a user of a roaming mobile station with access to a corporate name dialing system previously only available for the user if located within the home network. The arrangement will be referenced in the following as a corporate dialer. The corporate dialer can be implemented as a function of the connection management entities of the visited and home networks (e.g. the corporate access points of FIG. 1).

The corporate dialer routes the call from the roaming mobile station in accordance with name spoken to or otherwise input into the mobile station. The user of the roaming station may access the system by dialing a short access number, e.g. '444', regardless the country the roaming user is in at the very moment. Having such a number for a company e.g. all over the Europe in each country, a corporate traveller can call any of his/her colleagues just by giving the location (e.g. country or city) or business unit (e.g. "sales", "marketing", etc.) of the colleague and the full name of the called party. Having a replica of the user's personal list on the CAP associated with the foreign network, the roaming user is enabled to call via the service any of the names appearing in his/her personal list.

Retrieval of the name list by the roaming CAP provides several advantages. Even though the mobile station may already have a list of contact details as well as the number for the roaming CAP, the mobile station may, although their capabilities grow all the time, be capable of storing nothing more than a limited list. For a large company the list of employees and their contact information may be substantially large and, more importantly, the list may change regularly, even daily. It is thus advantageous to be able to store this information on the network side. Country-specific lists can also be made available e.g. for large international organizations. When e.g. a Finn goes to Germany, the CAP arrangement can be adapted to ensure that the Finnish country-specific list is available in the local German CAP for that particular visiting user when he/she is registered with the local CAP. A general list or a country specific list may be shared by a plurality of users.

In a more particular form of this embodiment, speech-enabled dialing is offered for a roaming subscriber. The speech enabled dialing will be described in more detail with reference to FIG. 4.

Figure 4:
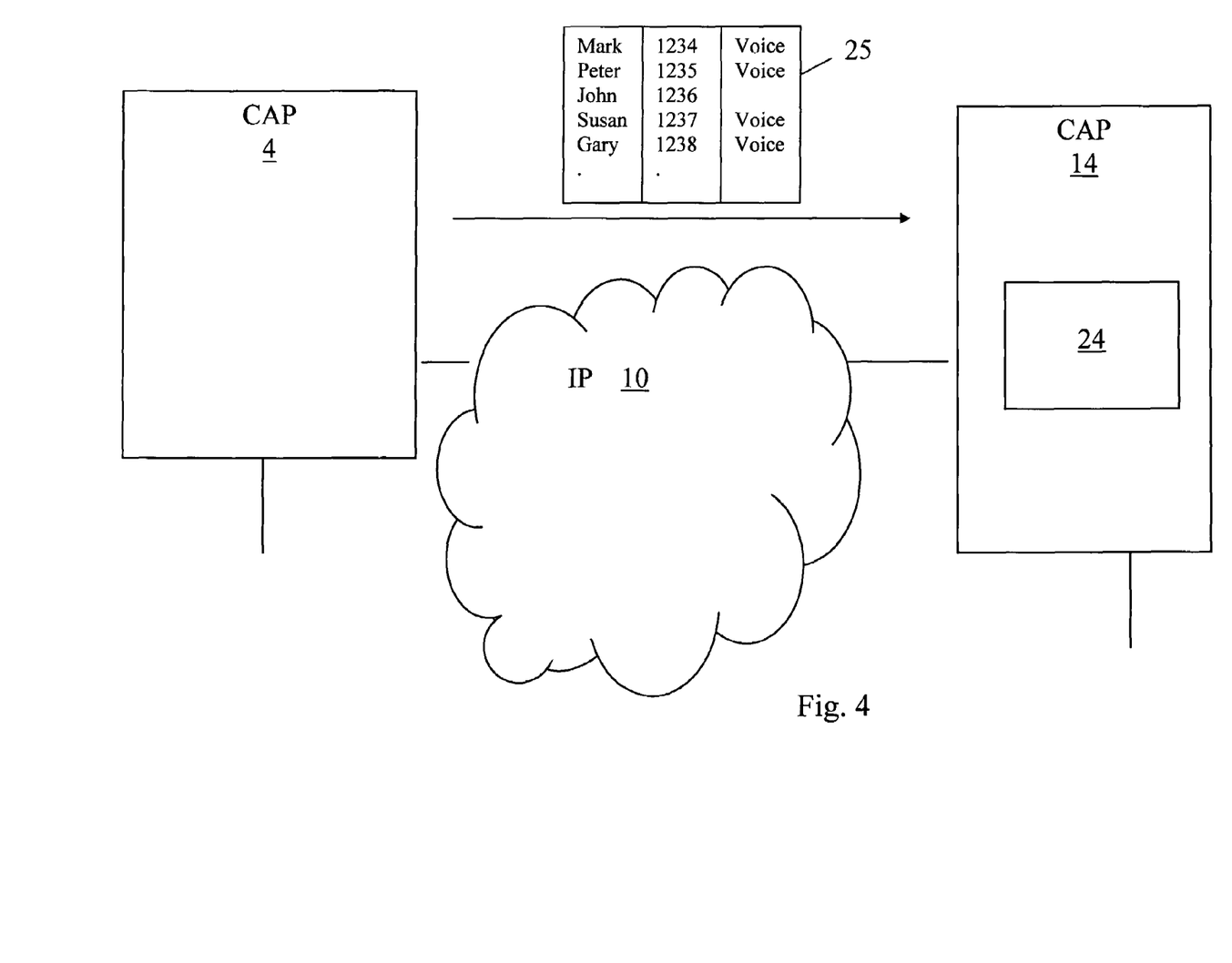
FIG. 4 shows a further embodiment of the present invention offering the user of a roaming station with a voice dialing facility.

The FIG. 4 embodiment provides two functionalities at the same time, namely corporate dialing by means of speaker-independent name dialing and VoIP re-routing of incoming and outgoing calls over the IP system 10. Thus after having contacted the local CAP, the user can say the location and the full name of a colleague, e.g. "Helsinki, Mark Smith" or just saying a name from the personal list, e.g. "Mark", after which the corresponding person is connected.

Voice dialing users can maintain a list of personal contact in the voice dialing service via e.g. a web interface. It is also possible that the personal contacts are stored for speaker-dependent name dialing, i.e. the user trains speech samples for the desired names on the personal contact list. However, a web-based interface for defining personal contacts in written form and then using speaker-independent name recognition is believed to be a more efficient and user-friendly approach.

User may find the possibility of being able to manage the lists handy. The network based storage enables storage of more names than what could be stored in the mobile station itself. The list and required information may be retrieved from the home CAP to the roamed CAP in a similar manner as the above described corporate telephone diary lists.

The embodiment provides the roaming users with a speech-enabled dialing mechanism that is similar to that they are used to in their home country. Furthermore, a speech-enabled dialing scheme provides ease-of-use, naturalness and enhanced safety for the user. This may be especially advantageous for users who are doing some other tasks, such as driving a car or being otherwise engaged with other tasks.

As above discussed, the mobile station may be provided with a built-in mechanism which provides automatic call setup for a roaming mobile station (e.g. the prefix '+358' is converted to '444p . . . '). However, it is possible for e.g.

convenience reasons that the user initiates the call by contacting the corporate dialer accessible through the CAP of the visited or home country. To initiate a call, the user may dial the number of the corporate dialer. This number may be the same as that of the local CAP, e.g. 444. After the user is connected to the corporate dialer it identifies the user based e.g. on the MSISDN number and activates the corporate telephone number list and possibly the personal contact list of the particular user. After the user has specified the desired name and the corporate dialer has recognized it, the number belonging to the recognized name is fetched from the corporate list or the personal contact list. Once this number is available, the corporate dialer then attempts to forward the call to the called party by calling the requested number. If the called number is in the home network, call routing via a third system may follow as discussed above with reference to FIG. 3.

In operation, after the roaming user has been identified as a corporate user, the visited CAP 14 provided with the corporate dialer functionality 24 downloads the personal telephone number list 25 of the user from the home CAP 4. The downloading occur preferably over the corporate IP system 10. The user is then capable to initiate both corporate and personal calls via the visited CAP 14 by giving the name of a colleague or other person on the personal list.

It shall be understood that although the above refers to organisations such as companies and corporations and international and national bodies, other type of users may also benefit from the embodiments. For example, virtual private network (VPN) clients, families with a short numbering scheme, sport clubs members, or even individuals subscribers can benefit from the proposed method.

The corporate dialer can be hosted by the company itself. Thus no telephone system operator needs to be involved. Instead, a VoIP connection over the IP system 10 can be used for the data transportation. If the dialer is implemented by the company, it is up to it how the dialer is utilized further, and no involvement of the local operators is needed. However, it is possible that corporate dialer platforms are provided by operators or 3$^{rd}$ parties who can then sell further the service. The corporate dialer can be embedded into the CAP platform, if so desired.

The corporate dialer may provide a user-friendly dialing mechanism. The corporate dialer may also provide efficient means for reducing roaming costs by enabling access to the corporate IP network through name dialing, especially if the mobile station cannot host an add-on software that implements the above described number conversion when a call or other connection is initiated by a roaming mobile station.

Though the above description of a further embodiment included the utilization of the corporate dialer, it shall be appreciated that this is not necessary for implementing the invention. Any IVR (interactive voice response) platform can take care of the above mechanism with the condition that it enables VoIP connectivity with advanced call control mechanism, and is preferably capable to drop the lines after the call is forwarded, and that the mobile station is configured so that the above described calling mechanism is enabled. PSTN or similar can be used temporarily for communication between the CAPs, e.g. in instances wherein the IP connection is temporarily down or overloaded.

The embodiments of the present invention are described above in the context wherein the third network 10 is an IP based communication system (VoIP). However, it shall be appreciated that the third communication network 10 can be any network capable of transferring communication between the terminals. For example, any packet switched network such as a frame relay network or asynchronous transfer mode (ATM) network or alike could be used. The communication could then be communicated e.g. as Voice over frame relay or Voice over ATM.

The third network 10 can be the communication network of the company or leased from an operator or provided by a 3$^{rd}$ party. The mobile telecommunications systems the user subscribe to can be any mobile system.

It shall also be appreciated that although the roaming uses a mobile station for the connection, the other party may subscribe to any type of network and that the home access point to the system may be associated with any type of communication network, such as a PSTN, a local area network (LAN) and so on.

For the sake of simplicity the invention was described above in relation to a corporate case. It shall be appreciated that the invention is applicable for any roaming mobile user.

In applications wherein registration to a CAP is triggered by detection of entering a network in a another country, it may be preferable to have only one CAP per country for a company. However, it is possible that due to e.g. traffic the capacity of such CAP must be scaled up. Even in that case, the same and only number should preferably be given for a country for a company.

A single CAP can serve many organizations. For different organizations different or same number can be given for the CAP. The CAP may determine the organization the CAP subscriber belongs to e.g. from the number or other identifier associated with the subscriber or the mobile station.

It is also noted herein that while the above describes exemplifying embodiments of the invention, there are several variations and modifications which may be made to the disclosed solution without departing from the scope of the present invention as defined in the appended claims.

The invention claimed is:

1. A method, comprising:
    registering a roaming mobile station with a second mobile communications network, the method being used for establishing a connection in a communication system, the connection involving the mobile station subscribing to a first mobile communications network and roaming in the second mobile communications network, the communication system comprising a first connection management entity provided in association with the first mobile communication network and a second connection management entity provided in association with the second mobile communication network;
    registering the roaming mobile station with the second connection management entity;
    in response to a request for a connection involving the roaming mobile station, routing signaling that associates with the request to one of the connection management entities;
    setting up a communications link between the first and second mobile communications networks via a third communications network by means of the first and second connection management entities based on said signaling associated with the request;
    establishing the requested connection by means of the communications link, the first mobile communications network and the second mobile communications network; and
    receiving the request for connection at a switching center of one of the first and the second mobile communications network, said switching center being configured to signal to the connection management entity provided in association with the same mobile communications network as said switching center in response to receiving the request, and said connection management entity being configured to request from the connection management entity provided in association with the other one of said first and second mobile communications networks for a communications link to be set-up between the first and second mobile communication networks.

2. The method as claimed in claim 1, wherein the third communications network comprises a packet switched data network.

3. The method as claimed in claim 2, wherein the packet switched data network is based on the Internet Protocol.

4. The method as claimed in claim 3, wherein the communications link comprises a Voice over Internet Protocol link.

5. The method as claimed in claim 2, wherein the packet switched data network is a frame relay network.

6. The method as claimed in claim 5, wherein the communications link comprises a Voice over frame relay link.

7. The method as claimed in claim 2, wherein the packet switched data network is a asynchronous transfer mode network.

8. The method as claimed in claim 7, wherein the communications link comprises a Voice over asynchronous transfer mode link.

9. The method as claimed in claim 1, wherein
the roaming mobile station is configured to originate the request for connection, and said switching center is associated with the second mobile communications network.

10. The method as claimed in claim 9, wherein the second connection management entity verifies if the connection is to be routed to the first mobile communications network before requesting for the set-up of the communications link between the first and second mobile communications networks.

11. The method as claimed in claim 9, wherein the connection is requested by the user of the roaming mobile station by calling to the second connection management entity.

12. The method as claimed in claim 9, wherein the request for the connection from the roaming mobile station is received at the switching center of the second mobile communications network and automatically signaled from the switching center of the second mobile communications network to the second connection management entity.

13. The method as claimed in claim 1, wherein
another party is configured to originate the request for a connection to the roaming mobile station, and said switching center is associated with the first mobile communications network.

14. The method as claimed in claim 1, comprising dropping one or both of the first and second connection management entities from the connection after the connection has been established between the parties.

15. The method as claimed in claim 1, comprising storing information regarding at least one connection management entity other than said first connection management entity in the memory means of the mobile station.

16. The method as claimed in claim 15, wherein the information comprises the network address of the said at least one connection management entity for enabling the mobile station to contact said network management entity.

17. The method as claimed in claim 1, comprising sending information regarding at least one connection management entity other than said first connection management entity to the mobile station.

18. The method as claimed in claim 1, further including the steps of:
storing in the first connection management entity information regarding one or more terminals to which the user of the mobile station might wish to establish a connection;
forwarding the stored information to the second connection management entity; and
initiating a connection establishment procedure based on the forwarded information.

19. The method as claimed in claim 18, wherein the connection establishment is based on a list of names and associated telephone numbers received from the first connection management entity.

20. The method as claimed in claim 18, wherein the connection establishment is initiated by sending a voice command from the roaming mobile station to the second connection management entity.

21. The method as claimed in claim 1, comprising:
determining the mobile communications network which the mobile station has roamed into; and
based on the knowledge of the roamed mobile communications network, registering the mobile station into the connection management entity associated with the roamed mobile communications network.

22. The method as claimed in claim 21, wherein the mobile communications network is determined based on an indicator received from the roamed network.

23. The method as claimed in claim 21, wherein the mobile communications network is determined based on information regarding the geographical location of the mobile station.

24. The method as claimed in claim 1, wherein the roaming mobile station initiates the connection establishment by calling to the second connection management entity;
the second mobile communications network routes the call to the second connection management entity; and
further information is given to the second connection management entity about the second party.

25. The method as claimed in claim 1, wherein the request for a connection is generated by the roaming mobile station such that the request includes information about the second connection management entity and the second party;
the second mobile communications network routes signalling associated with the request to the second connection management entity based on said information about the second connection management entity; and
the second connection management entity signals to the first connection management entity based on said information about the second party.

26. A communication system comprising:
a first mobile communications network;
a second mobile communications network;
a third communications network;
a register for registering a roaming mobile station with the second mobile communications network, the registration enabling the roaming mobile station to communicate via the second mobile communications network;
a first connection management entity provided in association with the first mobile communication network and interfacing the third communications network;

a second connection management entity provided in association with the second mobile communication network and interfacing the third communications network;

wherein the first and second connection management entities are arranged to provide a connection for a mobile station subscribing to the first mobile communications network and roaming in the second mobile communications network and registered with said register and also with said second connection management entity by setting up a communications link between the first and second mobile communications networks via the third communications network, wherein a switching center of one of the first and second mobile communications network is configured to receive the request for connection, said switching center being configured to signal to the connection management entity provided in association with the same mobile communications network as said switching center in response to receiving the request, and said connection management entity being configured to request from the connection management entity provided in association with the other one of said first and second mobile communications networks for a communications link to be set-up between the first and second mobile communication networks.

27. The communication system as claimed in claim 26, wherein the third communications network comprises a packet switched data network.

28. The communication system as claimed in claim 27, wherein the packet switched data network is based on the Internet Protocol.

29. The communication system as claimed in claim 28, wherein the communications link comprises a Voice over Internet Protocol link.

30. The communication system as claimed in claim 27, wherein the packet switched data network is a frame relay network.

31. The communication system as claimed in claim 30, wherein the communications link comprises a Voice over frame relay link.

32. The communication system as claimed in claim 27, wherein the packet switched data network is a asynchronous transfer mode network.

33. The communication system as claimed in claim 32, wherein the communications link comprises a Voice over asynchronous transfer mode link.

34. The communication system as claimed in claim 26, comprising:

storage means in the first connection management entity for storing information regarding one or more terminals to which the user of the roaming mobile station might wish to establish a connection; and means for forwarding the stored information to the second connection management entity, whereby a connection establishment procedure may be initiated at the second network based on the forwarded information.

35. The communication system as claimed in claim 34, wherein the information comprises a list of names and associated telephone numbers.

36. An apparatus, comprising:

registering means for registering a roaming mobile station with a second mobile communications network, the method being used for establishing a connection in a communication system, the connection involving the mobile station subscribing to a first mobile communications network and roaming in the second mobile communications network, the communication system comprising a first connection management entity provided in association with the first mobile communication network and a second connection management entity provided in association with the second mobile communication network;

registering means for registering the roaming mobile station with the second connection management entity;

routing means, in response to a request for a connection involving the roaming mobile station, for routing signaling that associates with the request to one of the connection management entities;

setting means for setting up a communications link between the first and second mobile communications networks via a third communications network by means of the first and second connection management entities based on said signaling associated with the request;

establishing means for establishing the requested connection by means of the communications link, the first mobile communications network and the second mobile communications network; and receiving means for receiving the request for connection at a switching center of one of the first and the second mobile communications network, said switching center being configured to signal to the connection management entity provided in association with the same mobile communications network as said switching center in response to receiving the request, and said connection management entity being configured to request from the connection management entity provided in association with the other one of said first and second mobile communications networks for a communications link to be set-up between the first and second mobile communication networks.

* * * * *